United States Patent [19]

Chuang

[11] Patent Number: 5,588,701
[45] Date of Patent: Dec. 31, 1996

[54] DEVICE FOR MOUNTING BABY CHAIR TO BICYCLE

[76] Inventor: Shi W. Chuang, No. 7th Floor-8, No. 20, Ta Lon Road, Taichung, Taiwan

[21] Appl. No.: 489,355

[22] Filed: Jun. 12, 1995

[51] Int. Cl.[6] .................................................... A47D 1/10
[52] U.S. Cl. .............................. 297/256.16; 297/195.13; 297/364; 297/217.7
[58] Field of Search .......................... 297/217.7, 195.12, 297/195.13, 256.16, 243, 440.22, 363, 364, 365

[56] References Cited

U.S. PATENT DOCUMENTS

| | | | |
|---|---|---|---|
| 4,030,648 | 6/1977 | Johnson et al. | 297/243 |
| 4,306,749 | 12/1981 | Deloustal | 297/256.16 |
| 4,634,177 | 1/1987 | Meeker | 297/256.16 |
| 5,299,818 | 4/1994 | Newbold | 297/363 |
| 5,385,387 | 1/1995 | Kain | 297/256.16 |

*Primary Examiner*—Peter M. Cuomo
*Assistant Examiner*—Anthony D. Barfield
*Attorney, Agent, or Firm*—Charles E. Baxley, Esq.

[57] ABSTRACT

A baby chair includes a rack having a puncture formed in the rear portion for engaging with a block which is secured to the baby chair, and having a channel intersecting with the puncture. The block has two hooks for engaging with the rack so as to secure the baby chair to the rack. A catch is engaged in the channel and the aperture and has a hook for engaging with the block so as to secure the catch to the block and the rack. The baby chair also includes a mechanism for adjusting the angular position between the seat portion and the back portion.

3 Claims, 6 Drawing Sheets

DEVICE FOR MOUNTING BABY CHAIR TO BICYCLE

BACKGROUND OF THE INVENTION

1. Field of the Invention

The present invention relates to a baby chair, and more particularly to a device for mounting a baby chair to a bicycle.

2. Description of the Prior Art

The closest prior art of which the applicant is aware is his prior U.S. Pat. No. 5,370,441 to Chuang, entitled "BABY CHAIR FOR WHEELED CYCLES", filed on Feb. 3, 1994. The baby chair provides a biasing means for resiliently supporting the baby chair and for preventing the brains of the babies from being hurt.

The present invention has arisen to provide a novel configuration for mounting the baby chair to the bicycles more easily.

SUMMARY OF THE INVENTION

The primary objective of the present invention is to provide a baby chair mounting device for easily, safely and stably mounting a baby chair onto a bicycle.

The other objective of the present invention is to provide a baby chair which includes a mechanism for adjusting the angular position between the back portion and the seat portion of the baby chair.

In accordance with one aspect of the invention, there is provided a baby chair and rack combination comprising a rack including a front portion and including a rear portion having a puncture formed therein, and including a channel laterally formed in the rear portion and communicating with the puncture, a baby chair including a front portion for engaging with the front portion of the rack and including a rear portion having a base secured thereto, a block secured to the base for engaging in the puncture of the rack and having securing means for engaging with the rack so as to secure the base to the rack, the block including an aperture formed therein for aligning with the channel of the rack, and a catch means for engaging in the channel of the rack and in the aperture of the block, and including a securing means for engaging with the block so as to secure the catch to the block.

The rack includes an orifice formed in the rear portion thereof and communicating with the channel, the catch means includes a cavity formed therein for slidably engaging with a button, and means for biasing the button outward of the catch means so as to engage the button in the orifice and so as to further secure the catch means to the rack.

The baby chair includes a seat portion and a back portion pivotally coupled together, includes a first and a second discs secured to the seat portion and the back portion respectively, includes a third and a fourth discs secured to the seat portion and the back portion respectively, includes a tube secured between the first and the third disc, includes a cover having at least one latch extended therefrom, and includes means for biasing the cover to engage with the fourth disc, the third disc includes at least one curved groove having two ends, the fourth disc includes at least one bulge for slidably engaging in the curved groove, the bulge includes a length slightly smaller than that of the curved groove so as to allow the bulge to move between the end portions of the curved groove, the third disc includes at least one first opening and at least two opening, the fourth disc includes at least one third opening and at least one fourth opening, the third opening is aligned with the first opening for engaging with the latch when the bulge is engaged in a first end portion of the end portions of the curved groove, and the fourth opening is aligned with the second opening for engaging with the latch when the bulge is engaged in a second end portion of the end portions.

The first disc includes at least two juts formed thereon, the second disc includes a knob pivotally coupled thereto, and a frame pivotally coupled to the knob, the frame includes a hook means for engaging with either of the juts so as to secure the first disc and the second disc together.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
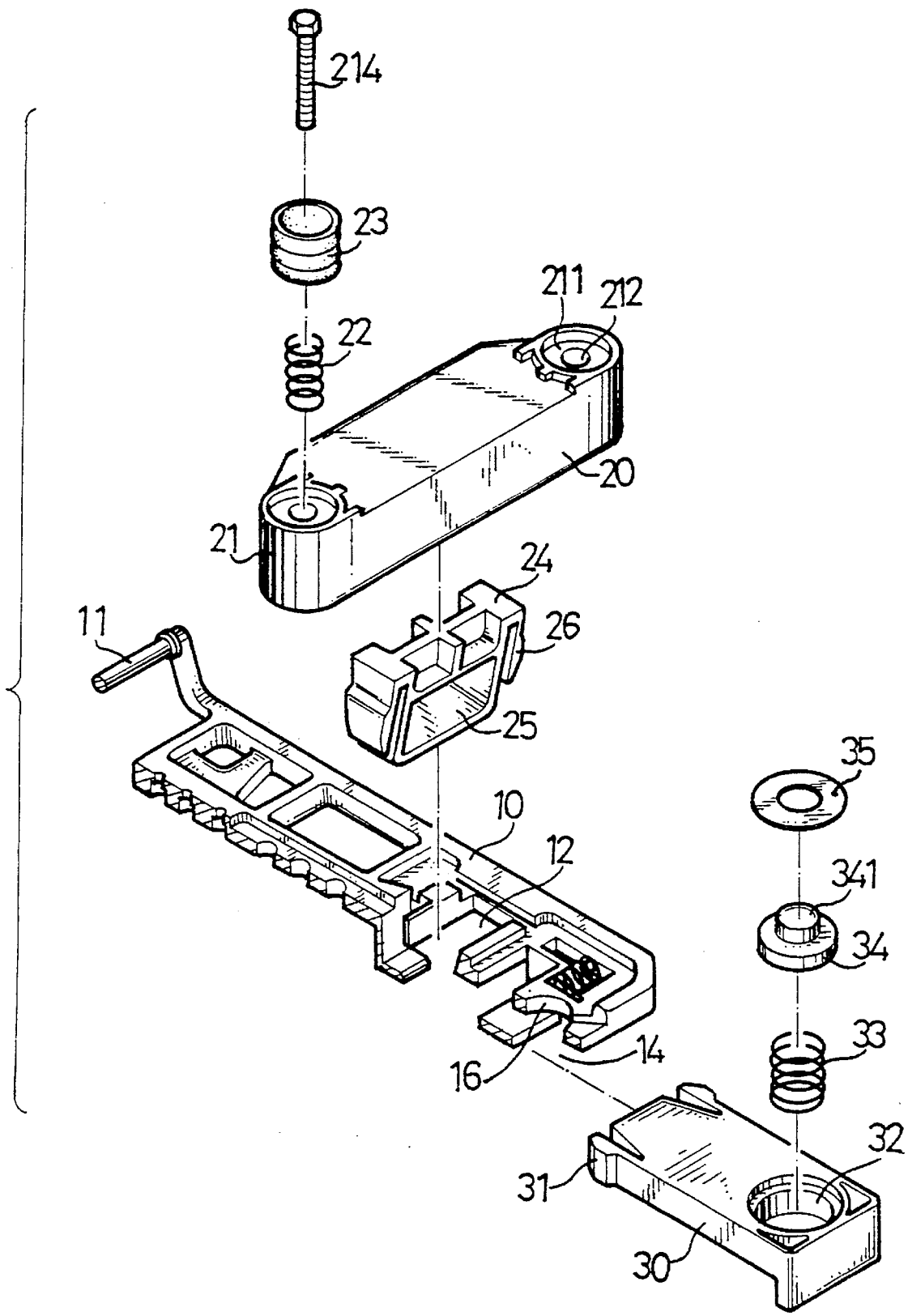
FIG. 1 is an exploded view of a baby chair mounting device in accordance with the present invention.
Figure 2:
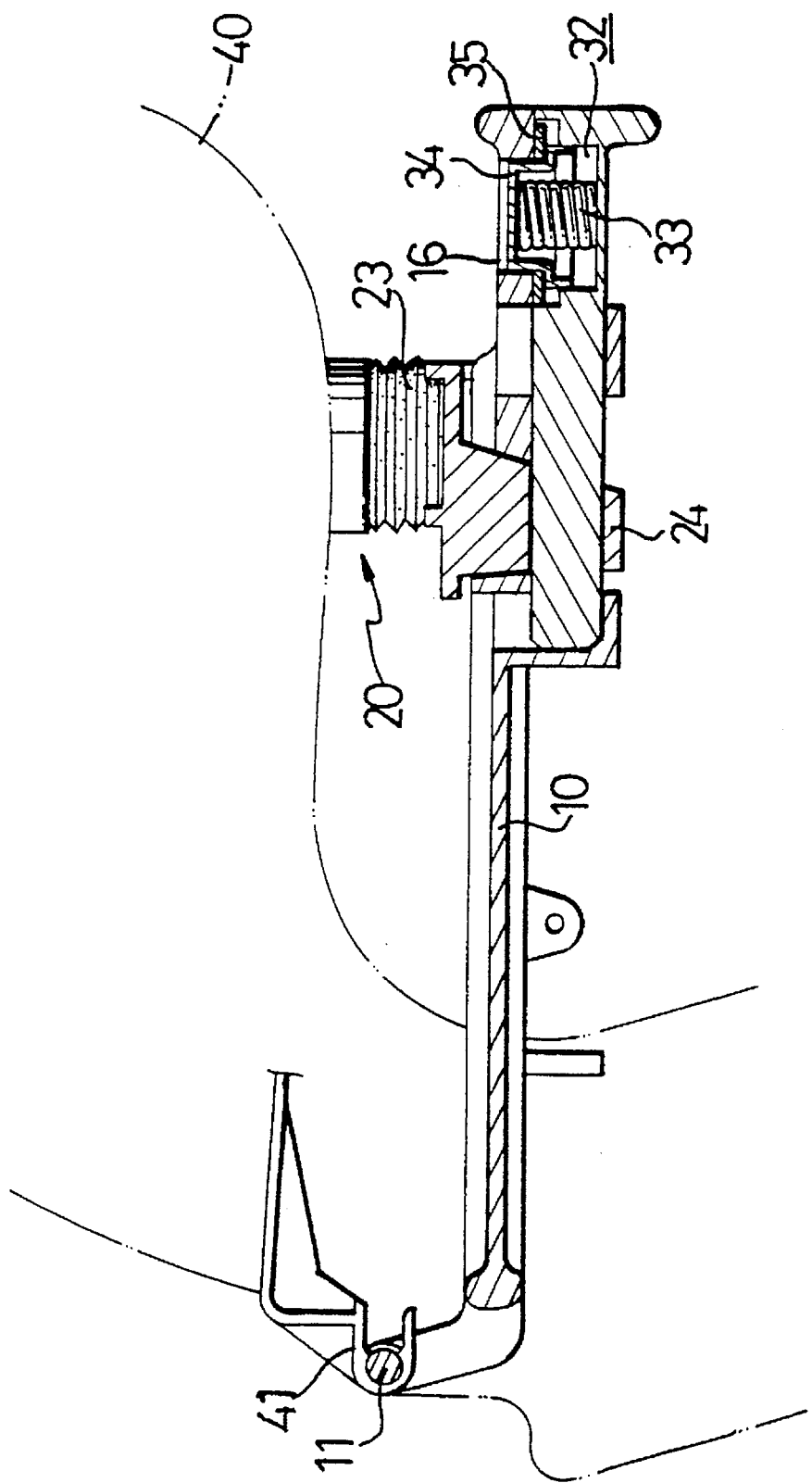
FIG. 2 is a cross sectional view illustrating the operation of the baby chair mounting device.
Figure 3:
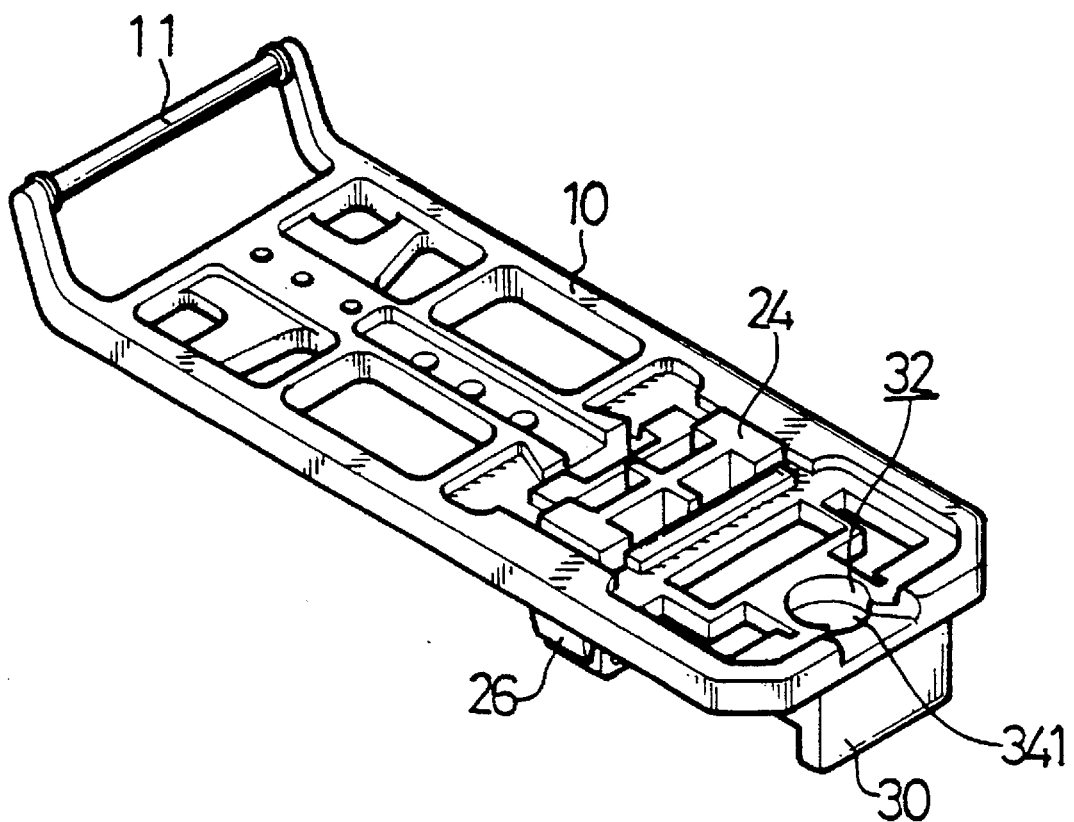
FIG. 3 is a perspective view of the baby chair mounting device.
Figure 4:
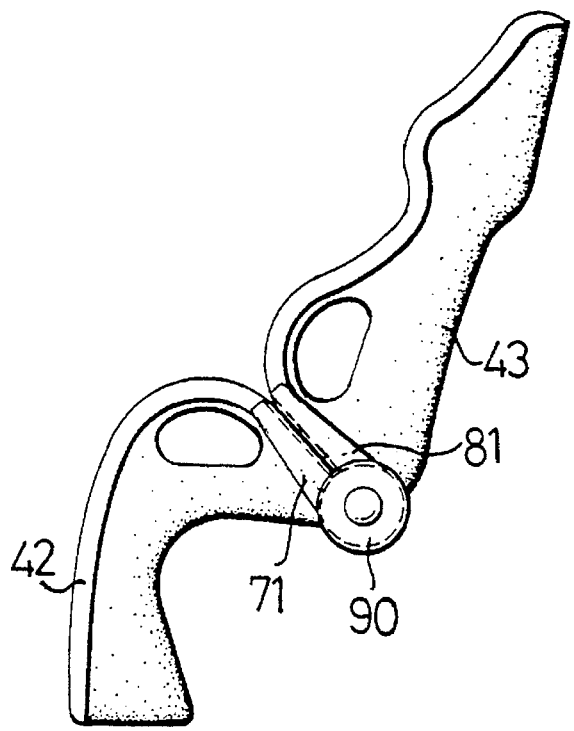
FIGS. 4 and 5 are side views illustrating the operation of the baby chair angular adjustment mechanism.
Figure 5:
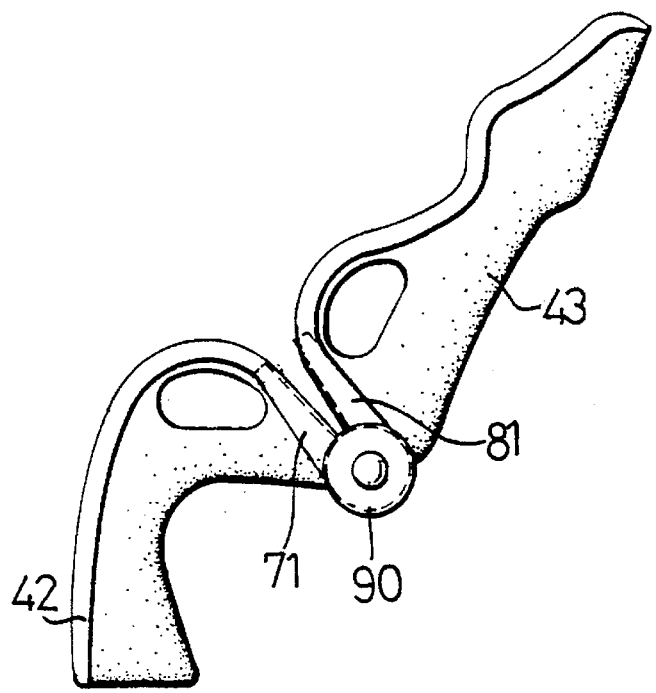
Figure 6:
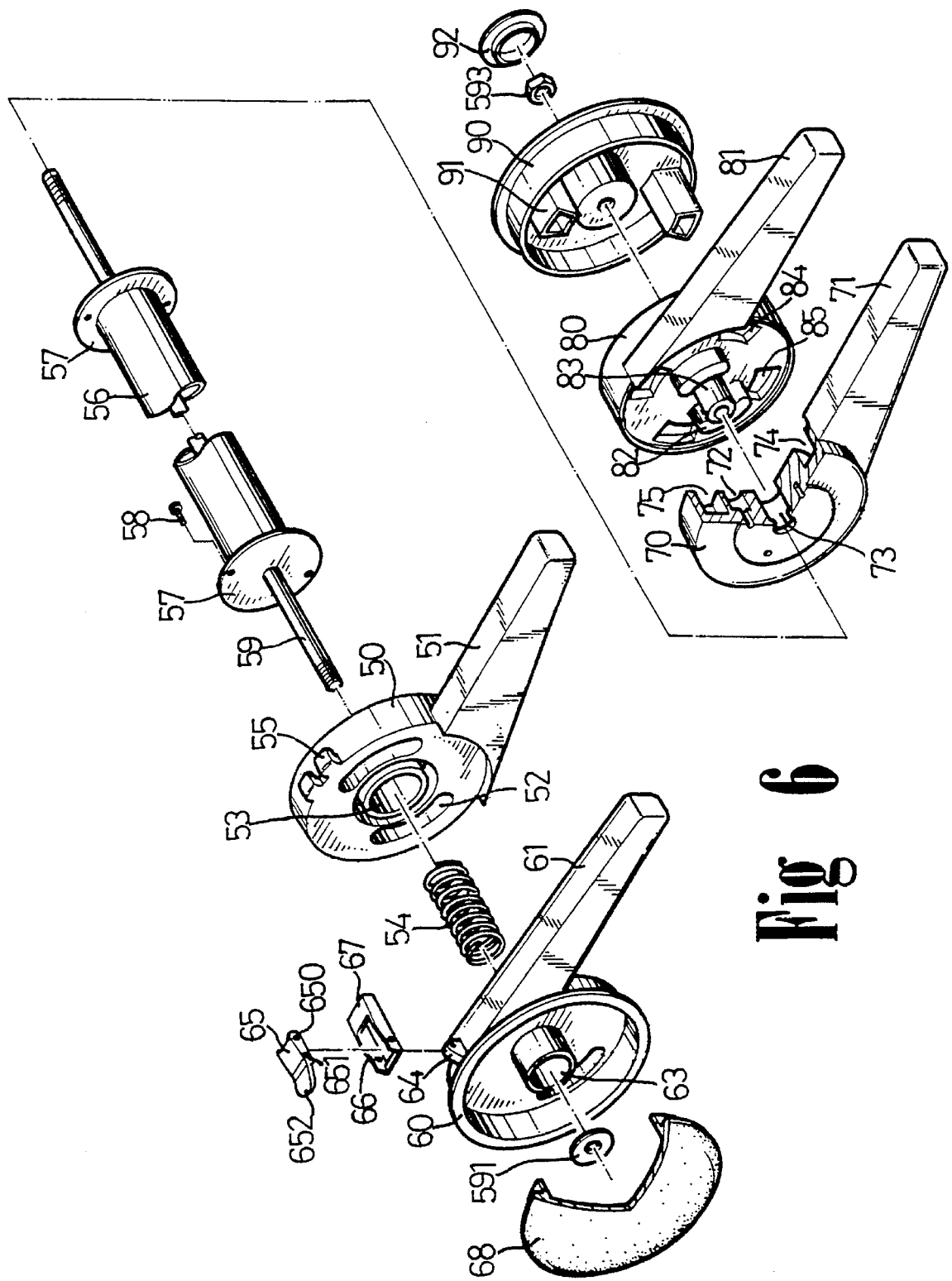
FIG. 6 is an exploded view of the baby chair angular adjustment mechanism.

Referring to the drawings, and initially to FIGS. 1 to 3, a baby chair mounting device in accordance with the present invention comprises a rack 10 including a rod 11 provided in the front portion for engaging with a hook means 41 of the baby chair 40. The rack 10 includes a puncture 12 and an orifice 16 formed in the rear portion, and includes a channel 14 laterally formed in the rear portion and communicating with the puncture 12 and the orifice 16.

A base 20 includes two end portions 21 each having a recess 211 formed in the upper portion for receiving a spring 22 and a bellows type sleeve 23 and each having a hole 212 formed therein for engaging with a bolt means 214 which may resiliently couple the baby chair 40 to the base 20. The coupling of the bolt means 214 to the base 20 is disclosed in the applicant's prior U.S. Pat. No. 5,370,441 and will not be described in further details. A block 24 is secured to time base 20 by such as welding process. However, for clearly showing the structure of the block 24, the block is separated from the base 20. The block 24 is engaged in the puncture 12 of the rack 10 and includes two hook means 26 for engaging with the rack 10 so as to secure the block 24 and the base 20 to the rack 10. The block 24 also includes an aperture 25 formed therein.

A catch 30 is engaged in the channel 14 of the rack 10 and engaged in the aperture 25 of the block 24, and includes a pair of hook means 31 for engaging with the block 24 so as to further secure the block 24 in place. The catch 30 includes a cavity 32 formed therein for engaging with a spring 33 and a button 34 therein. A ring 35 is engaged in top of the cavity 32 for retaining the button 34 and the spring 33 within the cavity 32. The button 34 includes a projection 341 extended upward through the ring 35 for engaging with the orifice 16 of the rack 10, such that the catch 30 may further be solidly secured to the rack 10. The base 20 is solidly secured to the rack 10 by the hook means 26 of the block 24. The block 24 is solidly secured to the rack 10 by the catch 30, and the catch 30 is solidly secured to the block 24 by the hook means and is solidly secured to the rack 10 by the projection 341 of the button 34. The projection 341 is depressed inward of the cavity 32 in order to release the catch 30, and the hook means 31 are depressed toward each other such that the catch 30 may be disengaged from the rack 10. The hook means 26 should also be pressed toward each other before the block 24 can be disengaged from the rack 10. Accordingly, the baby chair may be solidly secured to the rack 10 and will not be disengaged from the rack 10 inadvertently.

Figure 7:
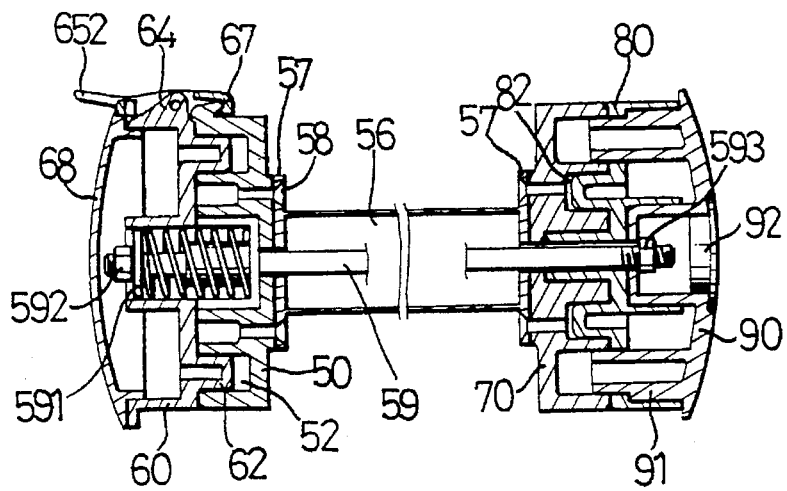
FIG. 7 is a cross sectional view of the baby chair angular adjustment mechanism.

Referring next to FIGS. 4 to 7, the present invention further includes a mechanism for adjusting the relative angular positions between the back portion 43 and the seat portion 42 of the baby chair. The mechanism includes two discs 50, 60 each includes an extension 51, 61 for fixing to the seat portion 42 and the back portion 43 of the baby chair. The disc 50 includes a pair of curved grooves 52 for engaging with a pair of bulges 62 (FIG. 7) of the other disc 60. The grooves 52 have a length slightly larger than that of the bulges 62 such that the bulges 62 and the disc 60 may rotate relative to the disc 50 for a small angle. The discs 50, 60 each includes a cavity 53, 63 formed therein for receiving a spring 54. The disc 50 includes two juts 55 formed thereon. The disc 60 includes an ear 64 formed thereon. A knob 65 has an end portion 650 pivotally coupled to the ear 64, has a middle portion 651 pivotally coupled to a frame 66, and has a hand grip 652 provided on the other end for actuating the knob 65 and the frame 66. The frame 66 includes a hook means 67 for engaging with either of the juts 55 so as to secure the discs 50, 60 together. A tube 56 is engaged between the seat portion 42 and the back portion 43 and has one end 57 fixed to the disc 50 by screws 58. A bolt 59 is rotatably engaged in the tube 56 and has one end engaged through the discs 50, 60 and a washer 591 and is threadedly engaged with a nut 592 (FIG. 7). The washer 591 is engaged with the spring 54. A cap 68 is engaged onto the disc 60 for enclosing the nut 592.

Two other discs 70, 80 each includes an extension 71, 81 for fixing to the seat portion 42 and the back portion 81 respectively. The disc 70 includes a pair of curved grooves 72 for engaging with a pair of bulges 82 (FIG. 7) of the other disc 80. The grooves 72 have a length slightly larger than that of the bulges 82 such that the bulges 82 and the disc 80 may rotate relative to the disc 70 for a small angle. The disc 80 includes a stud 83 rotatably engaged in a cavity 73 of the other disc 70. The tube 56 has the other end 57 fixed to the disc 70 by screws 58. The discs 70, 80 each includes two pairs of openings 74, 84; and 75, 85 for aligning with each other. A cover 90 is engaged on the disc 80 and includes a pair of latches 91 for engaging with either pair of the openings 74, 84; 75, 85. The bolt 59 has the other end engaged through the discs 70, 80 and the cover 90 and is engaged with a nut 593. A lid 92 is engaged onto the cover 90 for covering the nut 593.

Figures 8, 9:
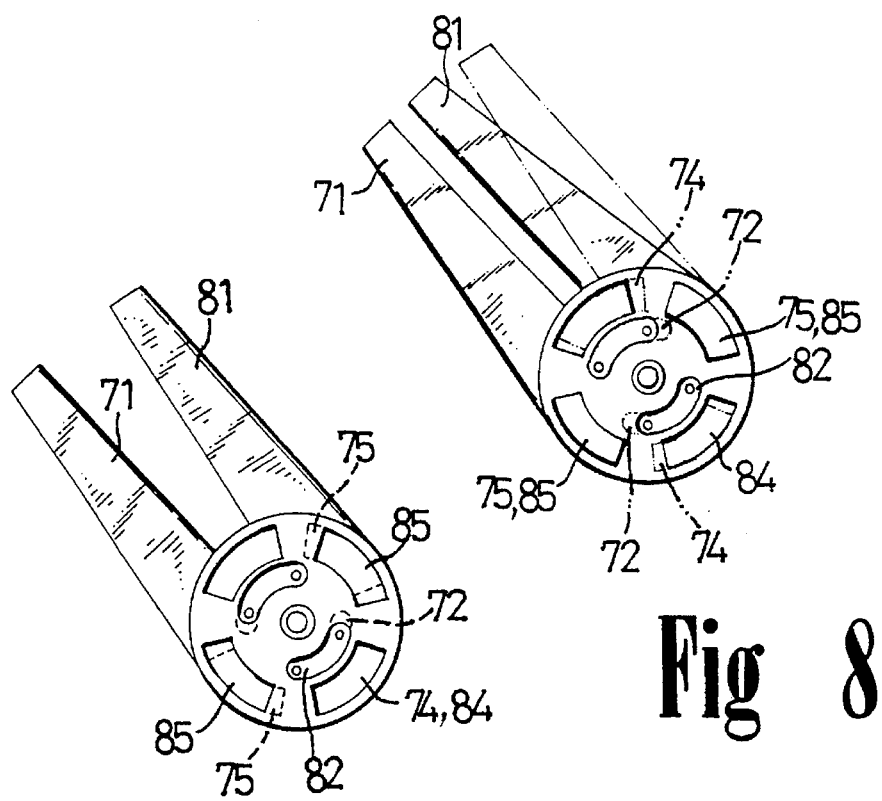
FIGS. 8 and 9 are schematic views illustrating the operation of the baby chair angular adjustment mechanism.

In operation, as shown in FIG. 8, when the pair of openings 75, 85 are aligned with each other, the latches 91 of the cover 90 may be engaged through the openings 75, 85 so as to position the discs 70, 80 in suitable angular positions. At this moment, the bulges 82 are engaged in one end of the grooves 72. When the latches 91 are disengaged from the openings 75, 85 and when the discs 70, 80 are rotated relative to each other until the bulges 82 are engaged in the other end of the grooves 72, the openings 74, 84 may be aligned with each other as shown in FIG. 9, such that the latches 91 may be engaged with the openings 74, 84 in order to position the discs 70, 80 in suitable angular positions. As shown in FIG. 7, the latches 91 of the cover 90 may be disengaged from the openings when the cover 90 and the bolt 59 are pulled against the spring 54, and the latches 91 may be biased to engage with either pairs of the openings 74, 84; 75, 85 by the spring 54.

Accordingly, the baby chair in accordance with the present invention may be easily and solidly secured to the rack of the bicycle and includes an adjusting mechanism for adjusting the relative angular position between the seat portion 42 and the back portion 43.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A baby chair and rack combination comprising:

a rack including a front portion and including a rear portion having a puncture formed therein, and including a channel laterally formed in said rear portion and communicating with said puncture, said rack including an orifice formed in said rear portion thereof and communicating with said channel, a baby chair including a front portion for engaging with said front portion of said rack and including a rear portion having a base secured thereto, a block secured to said base for engaging in said puncture of said rack and having a first securing means for engaging with said rack so as to secure said base to said rack, said block including an aperture formed therein for aligning with said channel of said rack, and a catch means for engaging in said channel of said rack and in said aperture of said block, said catch means including a second securing means for engaging with said block so as to secure said catch to said block, said catch means including a cavity formed therein for slidably engaging with a button, and said catch means including means for biasing said button outward of said catch means so as to engage said button in said orifice and so as to further secure said catch means to said rack.

2. A combination according to claim 1, wherein said baby chair includes a seat portion and a back portion pivotally coupled together, includes a first and a second discs secured to said seat portion and said back portion respectively, includes a third and a fourth discs secured to said seat portion and said back portion respectively, includes a tube secured between said first and said third disc, includes a cover having at least one latch extended therefrom, and includes means for biasing said cover to engage with said fourth disc, said third disc includes at least one curved groove having two ends, said fourth disc includes at least one bulge for slidably engaging in said curved groove, said bulge includes a length slightly smaller than that of said curved groove so as to allow said bulge to move between said end portions of said curved groove, said third disc includes at least one first opening and at least two second openings, said fourth disc includes at least one third opening and at least one fourth opening, said third opening is aligned with said first opening for engaging with said latch when said bulge is engaged in a first end portion of said end portions of said curved groove, and said fourth opening is aligned with said second opening for engaging with said latch when said bulge is engaged in a second end portion of said end portions.

3. A combination according to claim 2, wherein said first disc includes at least two juts formed thereon, said second disc includes a knob pivotally coupled thereto, and a frame pivotally coupled to said knob, said frame includes a hook means for engaging with either of said juts so as to secure said first disc and said second disc together.

* * * * *